United States Patent
Wang et al.

(10) Patent No.: US 11,639,721 B2
(45) Date of Patent: May 2, 2023

(54) MANUAL-AUTOMATIC INTEGRATED SELF-ADAPTIVE PUMP WITH INFRARED WATER LEVEL DETECTION FUNCTION

(71) Applicant: GP Enterprises Co., Ltd., Jiangsu (CN)

(72) Inventors: Xian Wang, Jiangsu (CN); Ningning Ding, Jiangsu (CN)

(73) Assignee: GP Enterprises Co., Ltd., Suzhou (CN)

( * ) Notice: Subject to any disclaimer, the term of this patent is extended or adjusted under 35 U.S.C. 154(b) by 316 days.

(21) Appl. No.: 17/253,609

(22) PCT Filed: Mar. 18, 2020

(86) PCT No.: PCT/CN2020/079932
§ 371 (c)(1),
(2) Date: Dec. 17, 2020

(87) PCT Pub. No.: WO2021/142918
PCT Pub. Date: Jul. 22, 2021

(65) Prior Publication Data
US 2022/0341427 A1    Oct. 27, 2022

(30) Foreign Application Priority Data

Jan. 17, 2020   (CN) .......................... 202010051100.2

(51) Int. Cl.
*F04D 13/06*     (2006.01)
*F04D 29/42*     (2006.01)
(Continued)

(52) U.S. Cl.
CPC .............. *F04D 13/06* (2013.01); *F04B 49/06* (2013.01); *F04B 49/065* (2013.01);
(Continued)

(58) Field of Classification Search
CPC .............. F04D 15/0218; F04D 13/086; F04D 15/0088; F04D 15/0236; F04D 29/4293;
(Continued)

(56) References Cited

U.S. PATENT DOCUMENTS 4,396,353 A * 8/1983 MacDonald ........ G01F 23/2922
417/36
7,625,187 B2 * 12/2009 Collins ............... F04D 15/0218
417/44.1
(Continued)

FOREIGN PATENT DOCUMENTS

CN    101624992 A    1/2010
CN    110206739 A    9/2019

*Primary Examiner* — Peter J Bertheaud (57) ABSTRACT

The present application discloses a manual-automatic integrated self-adaptive pump with an infrared water level detection function, which comprises a pump housing, a water pumping assembly, a base, a vacuum cofferdam, a water outlet pipeline, a volute, an exhaust port, a sensor adjusting mechanism and an infrared liquid level sensing assembly. In this way, the manual-automatic integrated self-adaptive pump with the infrared water level detection function provided by the present application has a compact structure, can be easily installed, has strong adaptability, can realize manual and automatic free switching, can realize more accurate detection of remaining water level, has a longer service life, and can solve the problem of sensing the water level in the field.

10 Claims, 7 Drawing Sheets

(51) Int. Cl.
    *G01F 23/292*     (2006.01)
    *F04D 13/08*     (2006.01)
    *F04D 15/02*     (2006.01)
    *F04D 15/00*     (2006.01)
    *F04D 29/60*     (2006.01)
    *F04D 25/06*     (2006.01)
    *G01F 23/263*     (2022.01)
    *F04B 49/06*     (2006.01)

(52) U.S. Cl.
    CPC ....... *F04D 13/086* (2013.01); *F04D 15/0088* (2013.01); *F04D 15/0218* (2013.01); *F04D 15/0236* (2013.01); *F04D 25/068* (2013.01); *F04D 29/426* (2013.01); *F04D 29/4293* (2013.01); *F04D 29/605* (2013.01); *G01F 23/266* (2013.01); *G01F 23/268* (2013.01); *G01F 23/292* (2013.01); *G01F 23/2922* (2013.01)

(58) Field of Classification Search
    CPC ...... F04D 25/068; F04D 29/605; F04D 13/06; F04D 29/426; F04B 49/065; F04B 49/06; G01F 23/266; G01F 23/268; G01F 23/292; G01F 23/2922
    See application file for complete search history.

(56) References Cited

U.S. PATENT DOCUMENTS

| | | | |
|---|---|---|---|
| 8,622,713 B2 * | 1/2014 | Hampton | .............. F04B 49/065 417/63 |
| 10,907,638 B2 * | 2/2021 | Wilds | ................... F04D 29/708 |

\* cited by examiner

MANUAL-AUTOMATIC INTEGRATED SELF-ADAPTIVE PUMP WITH INFRARED WATER LEVEL DETECTION FUNCTION

TECHNICAL FIELD

The present application relates to the field of water pumps, and in particular to a manual-automatic integrated self-adaptive pump with an infrared water level detection function.

BACKGROUND ART

At present, there are many kinds of multi-purpose pumps in the market. Existing water pumps have the following defects according to the comprehensive market investigation and user evaluation:

1. The sensor technology cannot meet the requirement of different water quality.
2. The remaining water level is high.
3. Motor cooling oil leaks.

However, the above problems are still troubling pump manufacturers and have not been solved substantially.

SUMMARY

The main technical problem to be solved by the present application is to provide a manual-automatic integrated self-adaptive pump with an infrared water level detection function, which has the advantages of high reliability, high detection accuracy, compact structure and the like, and has a wide market prospect in the application and popularization of water pumps.

In order to solve the above technical problems, one technical solution adopted by the present application is as follow:

Provided is a manual-automatic integrated self-adaptive pump with an infrared water level detection function, which includes a pump housing, a water pumping assembly, a base, a vacuum cofferdam, a water outlet pipeline, a volute, an exhaust port, a sensor adjusting mechanism and an infrared liquid level sensing assembly; the base is provided at a bottom of the pump housing, the base and the pump housing are in an integrated structure, the volute is provided with a water inlet, the vacuum cofferdam surrounds an outer side of the water inlet, and the vacuum cofferdam is fit with the water inlet to form a vacuum layer structure to reduce a water level of remaining water in a pump body;

the infrared liquid level sensing assembly is provided on a side surface of the pump housing, and the sensor adjusting mechanism drives the infrared liquid level sensing assembly to move up and down, and switches a detection position of the infrared liquid level sensing assembly according to a water level to be detected;

the volute is provided at a lower part of the pump housing, the water outlet pipeline is provided on the pump housing, a lower end of the water outlet pipeline is connected with the volute, the water pumping assembly delivers water from the water inlet to the water outlet pipeline for drainage through the volute, the exhaust port in the pump housing is in a submarine structure, one end of the exhaust port is communicated with a lower part of the water outlet pipeline, and the other end is communicated with the volute.

In one exemplary embodiment of the present application, the water pumping assembly includes a motor, an impeller, a motor housing, a motor tray, a pressing ring and a sealing ring, the motor tray is provided at the lower part of the pump housing, the motor housing is provided on the motor tray, the motor is provided in the motor housing, the impeller is provided in the volute, and the impeller is coaxially connected with the motor.

In one exemplary embodiment of the present application, the motor housing and the pump housing form a sealed chamber through the sealing ring, the sealing ring is fixed through the pressing ring, the motor tray is provided above the volute, a sealing gasket is provided between the volute and the pump housing, and the impeller is provided at a lower part of the motor tray.

In one exemplary embodiment of the present application, a check valve is provided at an upper part of the water outlet pipeline.

In one exemplary embodiment of the present application, a PCB control board is provided in the pump housing, and the PCB control board is electrically connected with the motor, the sensor adjusting mechanism and the infrared liquid level sensing assembly.

In one exemplary embodiment of the present application, the ground clearance of a bottom end of the vacuum cofferdam is 0.5-10 mm, and when the impeller rotates to produce negative pressure, the vacuum cofferdam is fit with the water inlet to form the vacuum layer structure to reduce the water level of the remaining water in the pump body.

In one exemplary embodiment of the present application, the infrared liquid level sensing assembly includes a case, an infrared water level sensor circuit board, a fixed block, an infrared receiving reflector, an infrared transmitting reflector, an infrared transmitter, an infrared receiver, a light guide hole and a sealing plug, the infrared water level sensor circuit board is electrically connected with the infrared transmitter and the infrared receiver, the fixed block is provided in the case, the infrared water level circuit board is provided on the fixed block, a light transmitting chamber is provided at a bottom of the case, the infrared receiving reflector and the infrared transmitting reflector are provided on an outer side of the light transmitting chamber, the infrared receiving reflector is connected with a bottom end of the infrared transmitting reflector, the light guide hole fit with the infrared transmitter and the infrared receiver is provided on the fixed block, and the sealing plug is provided at an opening of the case.

In one exemplary embodiment of the present application, the sensing case is made of a transparent material, the fixed block is made of an opaque material, and the number of the infrared receiving reflector and the number of the infrared transmitting reflector are respectively one or more.

In one exemplary embodiment of the present application, the sensor adjusting mechanism includes an upper case, a lower case, a key, an elastic mechanism, a stop ring, a guide groove, a guide bar, upper convex teeth, lower convex teeth, a tooth engagement chute and a rotating shaft, wherein the upper case is provided on the lower case, the infrared liquid level sensing assembly is movably provided in the lower case through the elastic mechanism, and the guide bar is provided on an inner wall of the upper case, the key moves up and down in the upper case, the stop ring is provided on an outer wall of the key, the upper convex teeth are provided at a lower part of the key, the rotating shaft is rotatably connected with the infrared liquid level sensing assembly, the lower convex teeth are provided at a top of the rotating shaft, the guide groove is provided between two adjacent lower convex teeth, the tooth engagement chute is provided on top surfaces of the lower convex teeth, the upper convex teeth are fit with the tooth engagement chute to drive the rotating shaft to lower down and rotate, such that the guide bar is connected with the guide groove or the tooth engagement chute to release or fix the infrared liquid level sensing assembly, so as to switch the position of the infrared liquid level sensing assembly.

In one exemplary embodiment of the present application, the upper convex teeth are fit with the tooth engagement chute to drive the rotating shaft to lower down and rotate, such that the guide bar is connected with the guide groove, at this moment the guide bar releases the infrared liquid level sensing assembly, and the infrared liquid level sensing assembly is located at an upper detection position; the upper convex teeth are fit with the tooth engagement chute to drive the rotating shaft to lower down and rotate, such that the guide bar is connected with the tooth engagement chute, at this moment the guide bar fixes the infrared liquid level sensing assembly, and the infrared liquid level sensing assembly is located at a lower detection position.

The present application has the following beneficial effects: the manual-automatic integrated self-adaptive pump with the infrared water level detection function has a compact structure, can be easily installed, can be used for liquids with different pH values, can resist chemical corrosion and electric corrosion, has strong adaptability, can realize manual and automatic free switching, can realize detection of lower remaining water level, can resist debris adhesion, can realize automatic fault diagnosis and automatic shutdown, does not make mechanical motion, has no friction loss, has a longer service life, and can solve the problem of sensing the water level in the field.

DESCRIPTION OF THE DRAWINGS

In order to more clearly describe the technical solutions in the embodiments of the present application, the drawings which need be used in the description of the embodiments will be briefly introduced below. Apparently, the drawings described below are some embodiments of the present application. Those skilled in the art may obtain other drawings according to these drawings without contributing any inventive labor.

DESCRIPTION OF THE EMBODIMENTS

The technical solutions in the embodiments of the present application will be described below clearly and completely. Apparently, the described embodiments are partial embodiments of the present application, instead of all embodiments. Based on the embodiments of the present application, all other embodiments obtained by those skilled in the art without contributing any inventive labor shall fall into the scope of protection of the present application.

Please refer to FIG. 1-FIG. 7. The embodiment of the present application is as follow:

A manual-automatic integrated self-adaptive pump with an infrared water level detection function structurally includes a pump housing 1, a lifting handle 2, a water pumping assembly, a base 19, a vacuum cofferdam 18, a water outlet pipeline 15, a volute 8, an exhaust port 10, a sensor adjusting mechanism and an infrared liquid level sensing assembly 5.

The base is provided at a bottom of the pump housing, the base and the pump housing are in an integrated structure, a rope tying hook 26 is provided on the base, a check valve 16 is provided at an upper part of the water outlet pipeline, the water outlet pipeline is provided on the pump housing, a lower end of the water outlet pipeline is communicated with the volute, and the water pumping assembly delivers water from the water inlet to the water outlet pipeline for drainage.

A PCB control board 23 is provided at an upper part of the pump housing, the PCB control board 23 is electrically connected with the water pumping assembly, the check valve, the sensor adjusting mechanism and the infrared liquid level sensing assembly, one end of a power wire 25 is connected with the PCB control board, the other rend stretches out of the pump housing, and the power wire is fixed on the pump housing through a fastener or a fastening member.

The exhaust port in the pump housing is in a submarine structure, one end of the exhaust port is communicated with a lower part of the water outlet pipeline, and the other end is communicated with the volute. When water is pumped, the exhaust port can realize hidden exhaust, and the water can return to the volute through the exhaust port.

The volute is provided at a bottom of the pump housing, a volute gasket 11 is provided between the volute and the pump housing, the volute is provided with a water inlet, the water inlet is provided with a water inlet filter screen 20, a vacuum cofferdam is further provided on the volute, the vacuum cofferdam is provided on an outer ring of the water inlet, the ground clearance is 0.5-10 mm, the vacuum cofferdam uses negative pressure of the water inlet to isolate external air for the purpose of enabling a water level of remaining water in the pump to be lower to form an ultra-low remaining water level vacuum layer structure. The vacuum cofferdam surrounds an outer side of the water inlet, and the vacuum cofferdam is fit with the water inlet to form a vacuum layer structure to reduce the water level of the remaining water in a pump body.

The water pumping assembly includes a motor 24, an impeller 7, a motor housing 12, a motor tray 9, a pressing ring 13 and a sealing ring 14, the motor tray is provided at the lower part of the pump housing, the motor housing is provided on the motor tray, the motor is provided in the motor housing, the impeller is provided in the volute, and the impeller is coaxially connected with the motor. The motor housing and the pump housing form a sealed chamber through the sealing ring, the sealing ring is fixed through the pressing ring, the motor tray is provided above the volute, a sealing gasket is provided between the volute and the pump housing, and the impeller is provided at a lower part of the motor tray.

The infrared liquid level sensing assembly is provided on a side surface of the pump housing, and the sensor adjusting mechanism drives the infrared liquid level sensing assembly to move up and down, and switches a detection position of the infrared liquid level sensing assembly according to a water level to be detected.

Figure 7:
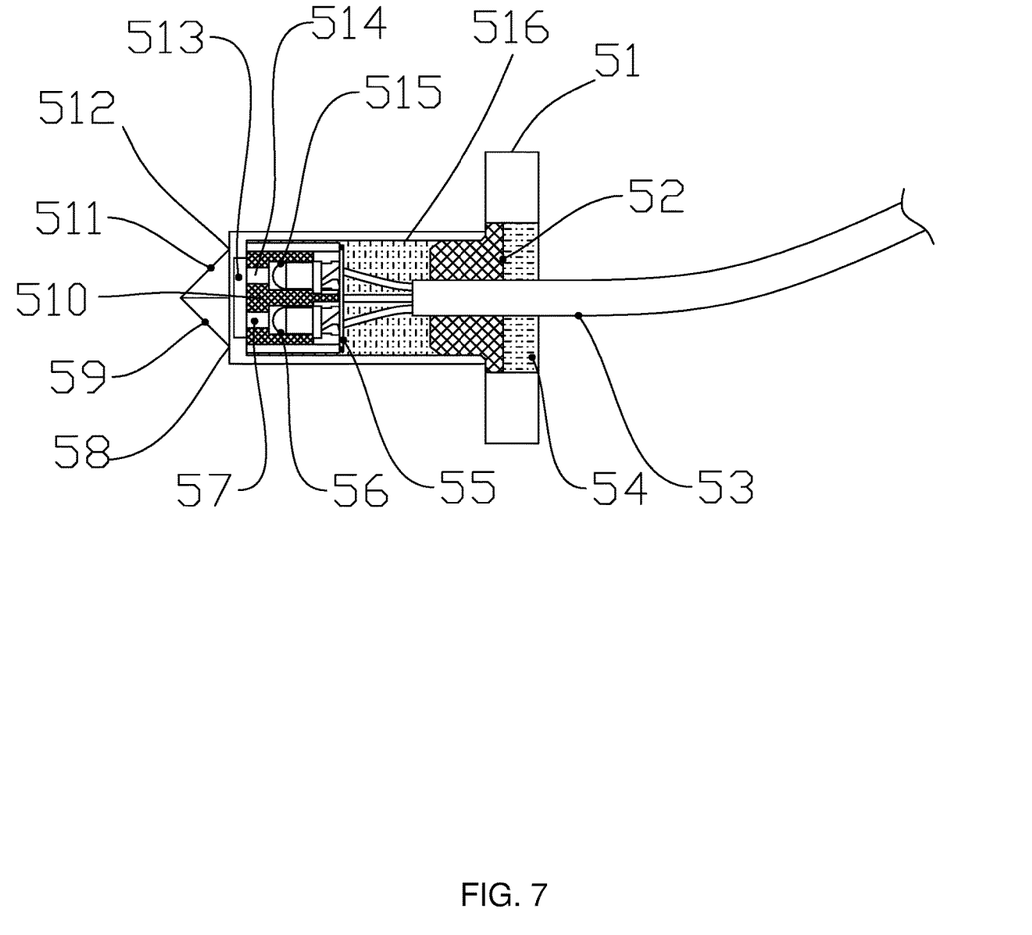
FIG. 7 is a structural schematic view of an infrared liquid level sensing assembly of a manual-automatic integrated self-adaptive pump with an infrared water level detection function according to one exemplary embodiment of the present application.

The infrared liquid level sensing assembly 5 is electrically connected with the PCB circuit board through a signal wire 53, and structurally includes a sliding guide rail 51, a sealing plug 52, a sealant coating layer 54, an infrared water level sensor circuit board 55, an infrared receiving module 56, a infrared receiving module light guide hole 57, an infrared receiving reflector included angle 58, an infrared receiving reflector 59, a fixed block 510, an infrared transmitting reflector 511, an infrared transmitting reflector included angle 512, a light transmitting chamber 513, an infrared transmitting module light guide hole 514, an infrared transmitting module 515 and a case 516.

The case is made of a transparent material, including light transmitting material. The shape of the case includes a round shape, a square shape, a triangular shape or other shapes. The fixed block of the infrared water level sensor circuit board is made of an opaque material, and the shape of the fixed block includes a round shape, a square shape, a triangular shape or other shapes.

The sliding guide rail is provided on the case, the number of the sliding guide rail may be one or more, the shape of the sliding guide rail includes a round shape, a square shape, a triangular shape or other shapes, the infrared receiving reflector (the number of the infrared receiving reflector may be one or more) and the infrared transmitting reflector (the number of the infrared transmitting reflector may be one or more) are further provided on an outer side of the light transmitting chamber, upper ends of the infrared receiving reflector and the infrared transmitting reflector are connected with the case, and a lower end of the infrared receiving reflector is connected with a lower end of the infrared transmitting reflector. When the number of two kinds of reflectors is respectively one, the reflector is spread at the bottom of the case. When the number of the two kinds of reflectors is respectively even, a pyramid structure (a quadrangular pyramid, a hexagonal pyramid, etc.) may be formed.

An included angle between an inner wall of the infrared receiving reflector and the case is the infrared receiving reflector included angle, which is 0-180° and optimally 45°. An included angle between an inner wall of the infrared transmitting reflector and the case is the infrared transmitting reflector included angle, which is 0-180° and optimally 45°. Thus, the accuracy of the entire infrared liquid level sensing assembly is improved.

The infrared transmitting module, the infrared receiving module, the signal wire and the sealing plug are provided on the infrared water level sensor circuit board. The infrared water level sensor circuit board is provided in a cavity in the case, and is sealed in the case through the sealing plug and the sealant coating layer.

The fixed block is made of an opaque material. One or more light guide holes are provided in the fixed block. The fixed block is provided in the case. The infrared water level sensor circuit board is fixed on the fixed block to form the light transmitting chamber together with the bottom of the case. A gap of the light transmitting chamber is 0-1000 mm.

When in use, an infrared ray transmitted by the infrared transmitting module passes through the infrared transmitting module light guide hole and is reflected by the infrared transmitting reflector. When the liquid level sensing assembly is in water, the water will reflect the infrared ray. After passing through the infrared receiving reflector and the infrared receiving module light guide hole, the infrared ray is received by the infrared receiving module. The infrared water level sensor circuit board obtains signals of the infrared receiving module and the infrared transmitting module, and computes specific water level or liquid level information.

Figure 6:
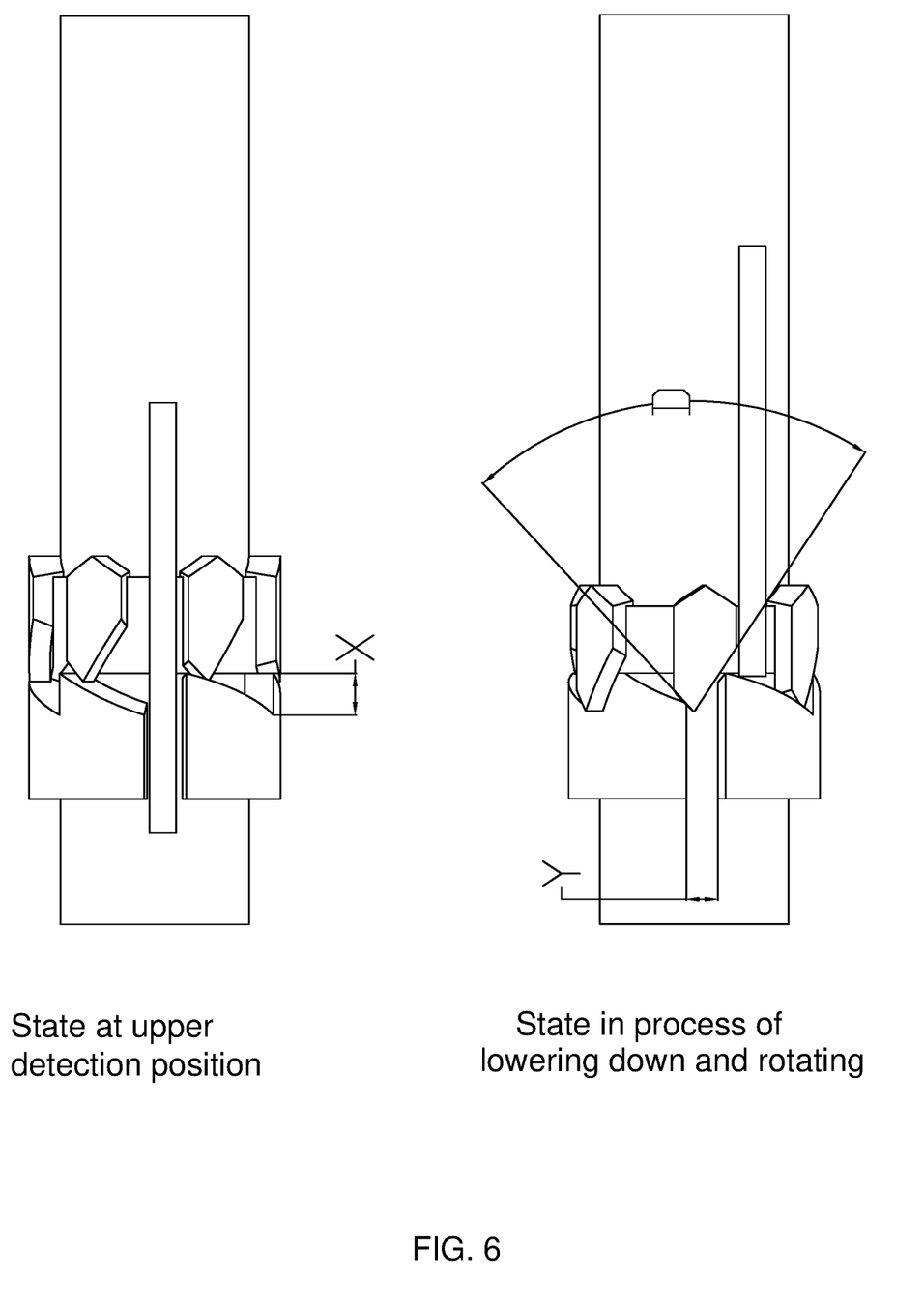
FIG. 6 is a state structural schematic view of a sensor adjusting mechanism of a manual-automatic integrated self-adaptive pump with an infrared water level detection function during detection position switching according to the present application.

The sensor adjusting mechanism includes an upper case 21, a lower case 22, a key 3, spring 6, a stop ring 31, a guide bar 211, upper convex teeth 32, lower convex teeth 33 and a tooth engagement mechanism 4. The tooth engagement mechanism includes a guide groove 41, a tooth engagement chute 42 and a rotating shaft 43.

A sensor water inlet is provided in a bottom surface of the lower case. A sensor water inlet filter screen 17 is provided at the water inlet.

The upper case is provided on the lower case, the infrared liquid level sensing assembly is movably provided in the lower case through the spring. The key moves up and down in the upper case. An upper part of the key passes through a through hole on a top surface of the upper case. The stop ring is provided on an outer wall of the key. The diameter of the stop ring is larger than the diameter of the through hole, so as to prevent the key from moving out of the upper case. The upper convex teeth are provided at a lower part of the key. A gap is provided between two adjacent upper convex teeth. Bottom ends of the upper convex teeth protrude from the bottom end of the key.

The rotating shaft is rotatably connected with the infrared liquid level sensing assembly. The sliding guide rail is provided in the lower case. The key drives the infrared liquid level sensing assembly to move up and down along the sliding guide rail. The lower convex teeth are provided at a top of the rotating shaft. A guide groove is provided between two adjacent lower convex teeth. The guide bar is provided on an inner wall of the upper case. The width of the lower convex teeth may be equal to or smaller than the width of the upper convex teeth. The width of the lower convex teeth may also be greater than the width of the upper convex teeth. In this way, the upper convex teeth and the guide bar can act on the inner and outer sides of the lower convex teeth respectively. A teeth fastening chute which gradually drops from the outer side to the middle is provided on the top surfaces of the lower convex teeth. The upper convex teeth are fit with the tooth engagement chute to drive the guide bar to be located in the guide groove or be movably connected with the tooth engagement chute to switch the position of the infrared liquid level sensing assembly. Thus, the operation smoothness, stability and accuracy of the entire sensor adjusting mechanism are improved.

In order to further improve the operation smoothness and stability of the tooth engagement mechanism, an included angle between the two guide surfaces at the bottom ends of the upper convex teeth is 1-89°, the width of the guide bar of the tooth engagement mechanism is 0.5-20 mm, and the angle of the tooth engagement chute is 1-89°.

The operation steps of the sensor adjusting mechanism include the following steps:

1. In an initial state, the infrared liquid level sensing assembly is located at the upper detection position, at this moment the spring is extended, the guide bar is movably provided in the guide groove, and the guide bar is located between two adjacent upper convex teeth.

Figure 1:
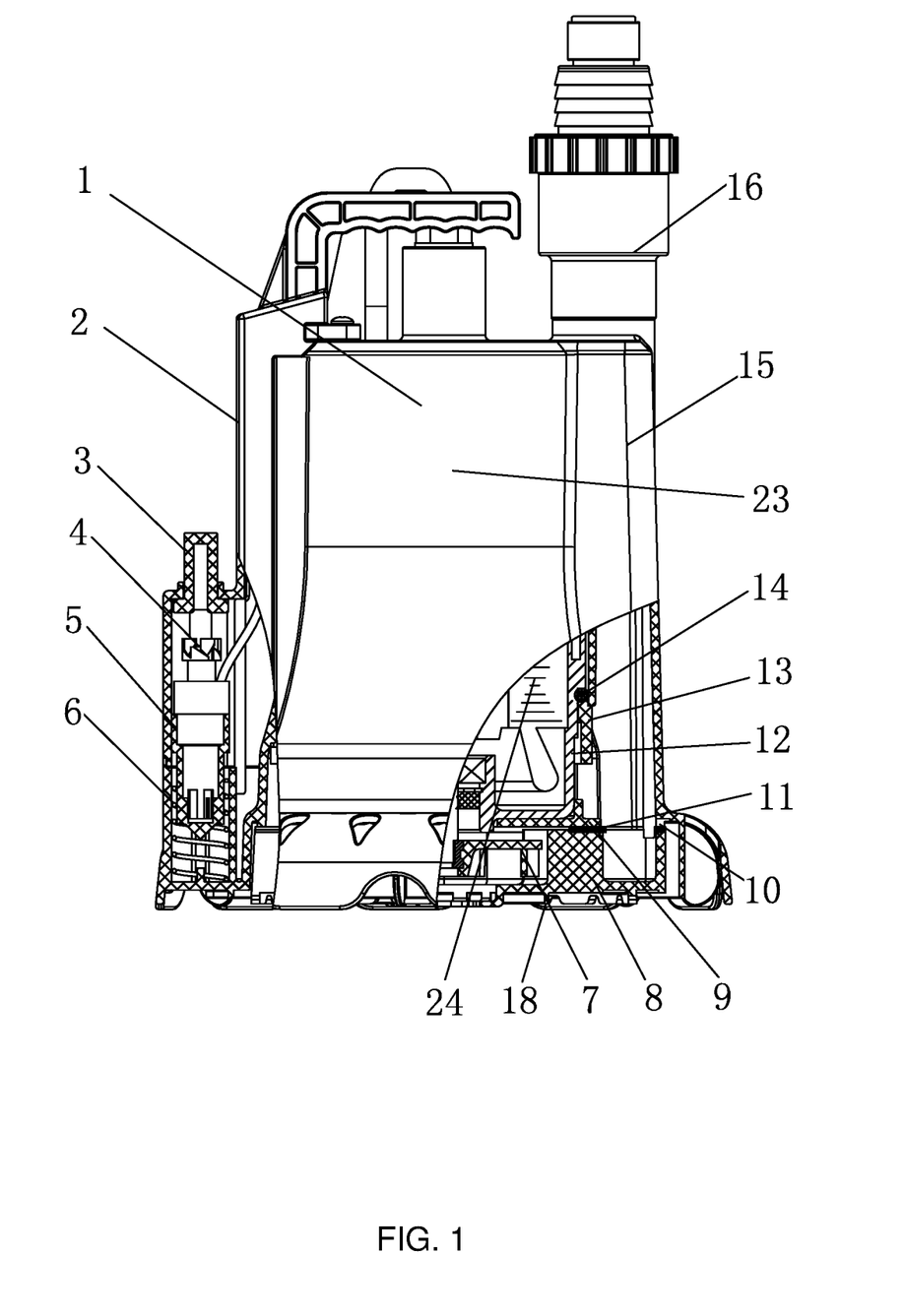
FIG. 1 is a three-dimensional structural schematic view of a manual-automatic integrated self-adaptive pump with an infrared water level detection function according to one exemplary embodiment of the present application.
Figure 2:
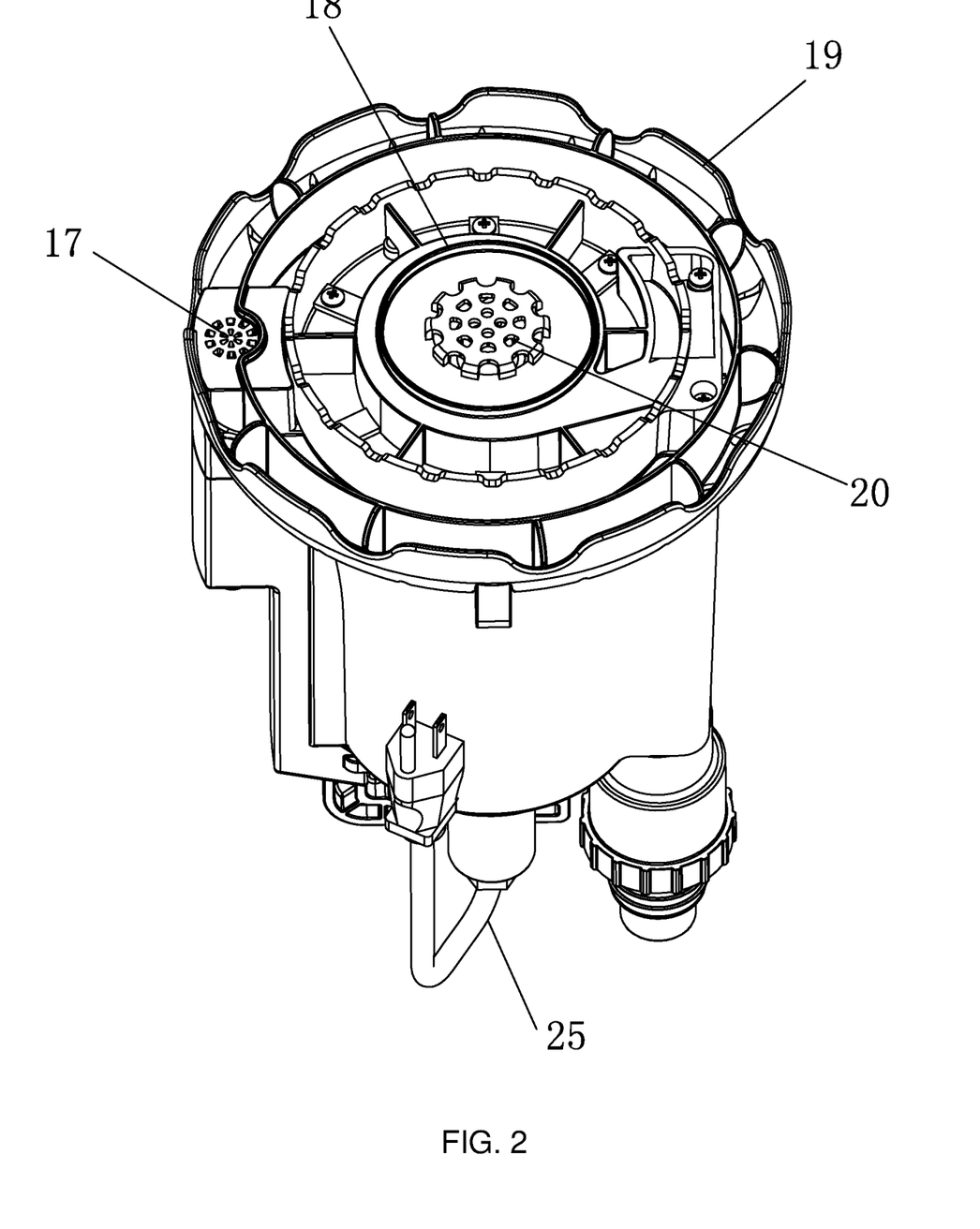
FIG. 2 is a bottom structural schematic view of a manual-automatic integrated self-adaptive pump with an infrared water level detection function according to one exemplary embodiment of the present application.
Figure 3:
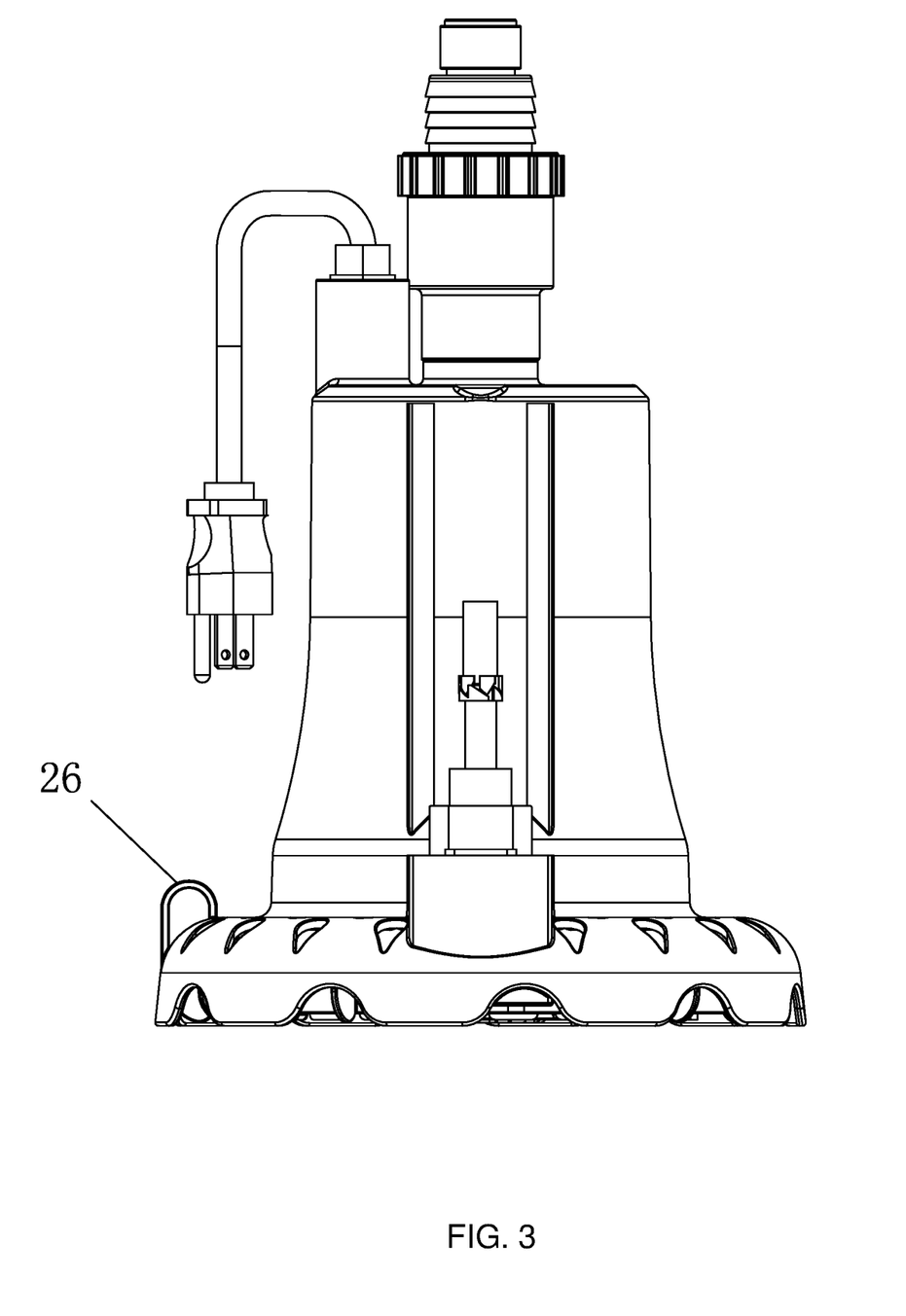
FIG. 3 is a side structural schematic view of a manual-automatic integrated self-adaptive pump with an infrared water level detection function according to one exemplary embodiment of the present application.
Figure 4:
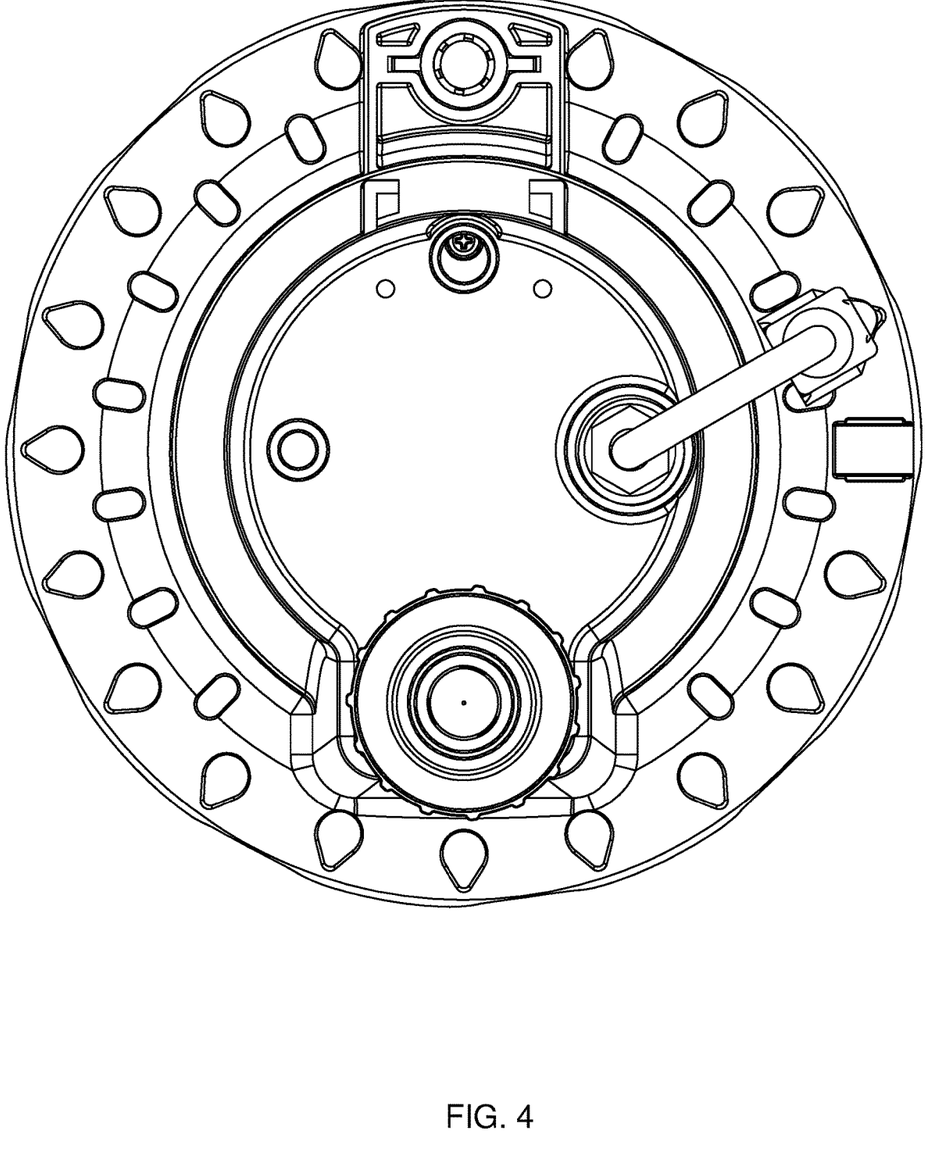
FIG. 4 is a top structural schematic view of a manual-automatic integrated self-adaptive pump with an infrared water level detection function according to one exemplary embodiment of the present application.
Figure 5:
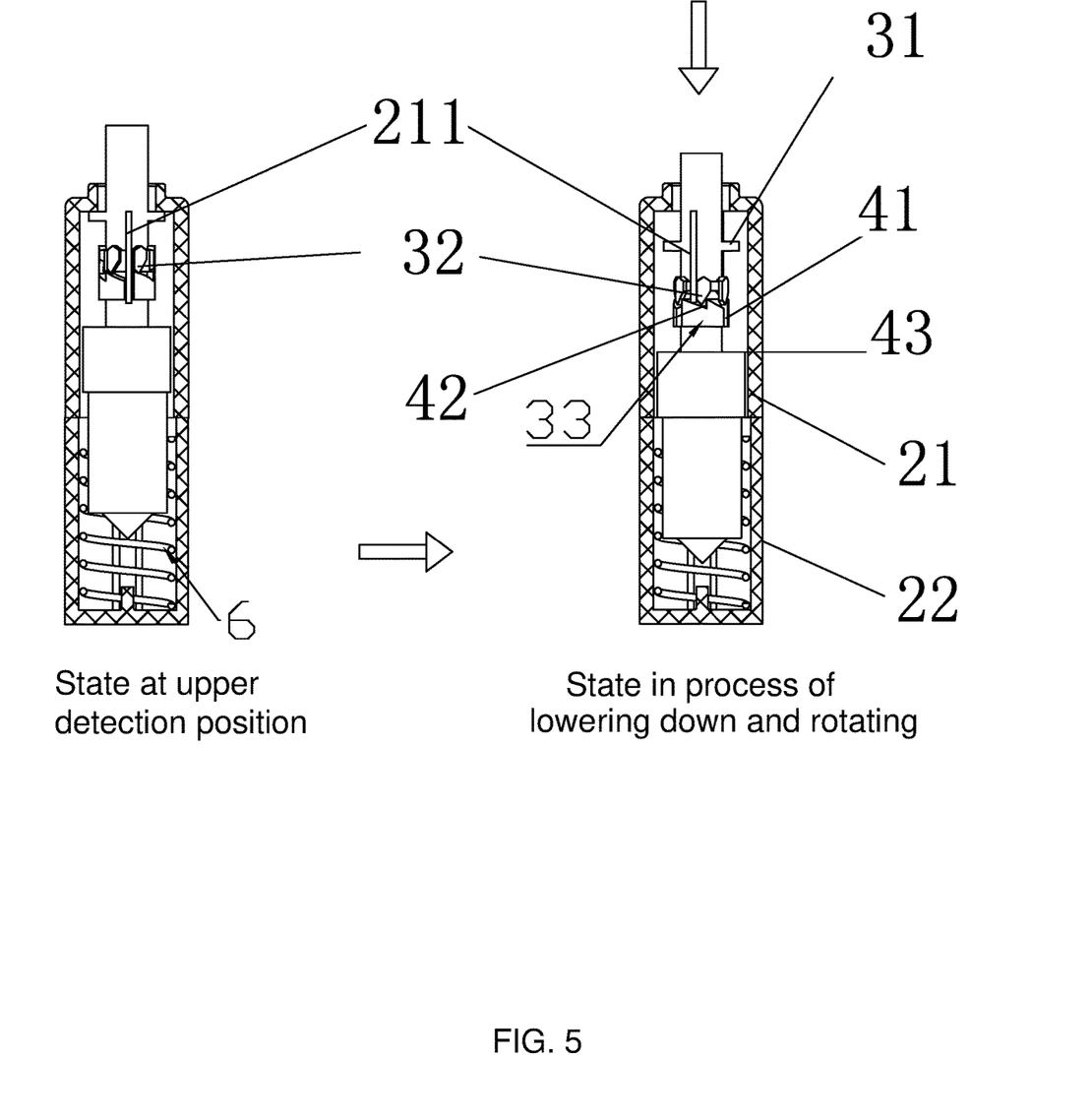
FIG. 5 is a state structural schematic view of a manual-automatic integrated self-adaptive pump with an infrared water level detection function during detection position switching according to the present application.

2. When it is required to switch to the lower detection position, 2.1 The key is pressed down for the first time, the upper convex teeth move along the tooth engagement chute and drive the rotating shaft to lower down, such that the guide bar is separated from the guide groove.

2.2 The upper convex teeth continue to move along the roots of the lower convex teeth (i.e., the lowest end of the tooth engagement chute). Since the key and the upper convex teeth cannot rotate and can only move up and down, under the effect of the downward pressing force, the upper convex teeth can squeeze the rotating shaft towards a preset direction through the tooth engagement chute, thus driving the rotating shaft to rotate (clockwise).

2.3 When the upper convex teeth move to the roots of the lower convex teeth (i.e., the lowest end of the tooth engagement chute), the rotating shaft rotates ¼ turn (clockwise), and at this moment the lower convex teeth move to a position below guide bar.

2.4 The key is released, the guide bar presses against the tooth engagement chute on the lower convex teeth and moves along the tooth engagement chute to the roots of the lower convex teeth (i.e., the lowest end of the tooth engagement chute), at this time the upper convex teeth are again located above the tooth engagement chute, the lower convex teeth cannot be bounced, the spring is in a compressed state, and thus the infrared liquid level sensing assembly is switched to the lower detection position.

3. When it is required to switch to the lower detection position:

3.1 On the basis of step 2, the key is pressed down again, and the upper convex teeth move along the tooth engagement chute and drive the rotating shaft to lower down, such that the guide bar is separated from the tooth engagement chute.

3.2 The upper convex teeth continue to move along the roots of the lower convex teeth (i.e., the lowest end of the tooth engagement chute). Under the effect of the downward force, the upper convex teeth can squeeze the rotating shaft towards a preset direction through the tooth engagement chute, thus driving the rotating shaft to rotate (clockwise).

3.3 When the upper convex teeth move to the roots of the lower convex teeth (i.e., the lowest end of the tooth engagement chute), the rotating shaft continues to rotate ¼ turn (clockwise), and at this moment the guide groove moves to a position below the guide bar.

3.4 The key is released, and the guide bar returns to the guide groove. At this moment, under the effect of the spring which is bounced back, the infrared liquid level sensing assembly is lifted and switched to the upper detection position. The rotating shaft can rotate clockwise or anticlockwise. However, one set of equipment can only select one movement direction, that is, the rotating shaft can always move in one direction and cannot rotate back and forth.

4. In this way, by pressing the spring once such that the spring is compressed and pressing the spring again such that the spring is bounced, the manual-automatic integrated self-adaptive switching structure is realized.

The manual-automatic integrated self-adaptive pump with the infrared water level detection function provided by the present application has the following beneficial effects: the manual-automatic integrated self-adaptive pump with the infrared water level detection function has a compact structure, can be easily installed, can be used for liquids with different pH values, can resist chemical corrosion and electric corrosion, has strong adaptability, can realize manual and automatic free switching, can realize detection of lower remaining water level, can resist debris adhesion, can realize automatic fault diagnosis and automatic shutdown, does not make mechanical motion, has no friction loss, has a longer service life, and can solve the problem of sensing the water level in the field.

What are described above are just embodiments of the present application, instead of limitations to the scope of protection of the present application. All equivalent structure or equivalent process variations made according to the content of the description of the present application, or direct or indirect applications to other related technical fields shall be also included in the scope of protection of the present application.

The invention claimed is:

1. A manual-automatic integrated self-adaptive pump with an infrared water level detection function, wherein the manual-automatic integrated self-adaptive pump with the infrared water level detection function comprises a pump housing, a water pumping assembly, a base, a vacuum cofferdam, a water outlet pipeline, a volute, an exhaust port, a sensor adjusting mechanism and an infrared liquid level sensing assembly;

the base is provided at a bottom of the pump housing, the base and the pump housing are in an integrated structure, the volute is provided with a water inlet, the vacuum cofferdam surrounds an outer side of the water inlet, and the vacuum cofferdam is fit with the water inlet to form a vacuum layer structure to reduce a water level of remaining water in a pump body;

the infrared liquid level sensing assembly is provided on a side surface of the pump housing, and the sensor adjusting mechanism drives the infrared liquid level sensing assembly to move up and down, and switches a detection position of the infrared liquid level sensing assembly according to a water level to be detected;

the volute is provided at a lower part of the pump housing, the water outlet pipeline is provided on the pump housing, a lower end of the water outlet pipeline is connected with the volute, the water pumping assembly delivers water from the water inlet to the water outlet pipeline for drainage through the volute, the exhaust port in the pump housing is in a submarine structure, one end of the exhaust port is communicated with a lower part of the water outlet pipeline, and the other end is communicated with the volute.

2. The manual-automatic integrated self-adaptive pump with the infrared water level detection function according to claim 1, wherein the water pumping assembly comprises a motor, an impeller, a motor housing, a motor tray, a pressing ring and a sealing ring, the motor tray is provided at the lower part of the pump housing, the motor housing is provided on the motor tray, the motor is provided in the motor housing, the impeller is provided in the volute, and the impeller is coaxially connected with the motor.

3. The manual-automatic integrated self-adaptive pump with the infrared water level detection function according to claim 2, wherein the motor housing and the pump housing form a sealed chamber through the sealing ring, the sealing ring is fixed through the pressing ring, the motor tray is provided above the volute, a sealing gasket is provided between the volute and the pump housing, and the impeller is provided at a lower part of the motor tray.

4. The manual-automatic integrated self-adaptive pump with the infrared water level detection function according to claim 1, wherein a check valve is provided at an upper part of the water outlet pipeline.

5. The manual-automatic integrated self-adaptive pump with the infrared water level detection function according to claim 2, wherein a PCB control board is provided in the pump housing, and the PCB control board is electrically connected with the motor, the sensor adjusting mechanism and the infrared liquid level sensing assembly.

6. The manual-automatic integrated self-adaptive pump with the infrared water level detection function according to claim 2, wherein the ground clearance of a bottom end of the vacuum cofferdam is 0.5-10 mm, and when the impeller rotates to produce negative pressure, the vacuum cofferdam is fit with the water inlet to form the vacuum layer structure to reduce the water level of the remaining water in the pump body.

7. The manual-automatic integrated self-adaptive pump with the infrared water level detection function according to claim 1, wherein the infrared liquid level sensing assembly comprises a case, an infrared water level sensor circuit board, a fixed block, an infrared receiving reflector, an infrared transmitting reflector, an infrared transmitter, an infrared receiver, a light guide hole and a sealing plug, the infrared water level sensor circuit board is electrically connected with the infrared transmitter and the infrared receiver, the fixed block is provided in the case, the infrared water level circuit board is provided on the fixed block, a light transmitting chamber is provided at a bottom of the case, the infrared receiving reflector and the infrared transmitting reflector are provided on an outer side of the light transmitting chamber, the infrared receiving reflector is connected with a bottom end of the infrared transmitting reflector, the light guide hole fit with the infrared transmitter and the infrared receiver is provided on the fixed block, the sealing plug is provided at an opening of the case, a signal wire is connected onto the infrared water level sensor circuit board, and the sealing plug is integrally connected with the signal wire.

8. The manual-automatic integrated self-adaptive pump with the infrared water level detection function according to claim 1, wherein the sensing case is made of a transparent material, the fixed block is made of an opaque material, and the number of the infrared receiving reflector and the number of the infrared transmitting reflector are respectively one or more.

9. The manual-automatic integrated self-adaptive pump with the infrared water level detection function according to claim 1, wherein the sensor adjusting mechanism comprises an upper case, a lower case, a key, an elastic mechanism, a stop ring, a guide groove, a guide bar, upper convex teeth, lower convex teeth, a tooth engagement chute and a rotating shaft, the upper case is provided on the lower case, the infrared liquid level sensing assembly is movably provided in the lower case through the elastic mechanism, and the guide bar is provided on an inner wall of the upper case, the key moves up and down in the upper case, the stop ring is provided on an outer wall of the key, the upper convex teeth are provided at a lower part of the key, the rotating shaft is rotatably connected with the infrared liquid level sensing assembly, the lower convex teeth are provided at a top of the rotating shaft, the guide groove is provided between two adjacent lower convex teeth, the tooth engagement chute is provided on top surfaces of the lower convex teeth, the upper convex teeth are fit with the tooth engagement chute to drive the rotating shaft to lower down and rotate, such that the guide bar is connected with the guide groove or the tooth engagement chute to release or fix the infrared liquid level sensing assembly, so as to switch the position of the infrared liquid level sensing assembly.

10. The manual-automatic integrated self-adaptive pump with the infrared water level detection function according to claim 9, wherein the upper convex teeth are fit with the tooth engagement chute to drive the rotating shaft to lower down and rotate, such that the guide bar is connected with the guide groove, at this moment the guide bar releases the infrared liquid level sensing assembly, and the infrared liquid level sensing assembly is located at an upper detection position; the upper convex teeth are fit with the tooth engagement chute to drive the rotating shaft to lower down and rotate, such that the guide bar is connected with the tooth engagement chute, at this moment the guide bar fixes the infrared liquid level sensing assembly, and the infrared liquid level sensing assembly is located at a lower detection position.

\* \* \* \* \*